(12) United States Patent
Odajima et al.

(10) Patent No.: US 7,855,533 B2
(45) Date of Patent: Dec. 21, 2010

(54) CHARGING APPARATUS

(75) Inventors: Yoshimitu Odajima, Osaka (JP); Junji Takemoto, Hyogo (JP); Kazuki Morita, Osaka (JP)

(73) Assignee: Panasonic Corporation, Osaka (JP)

( * ) Notice: Subject to any disclaimer, the term of this patent is extended or adjusted under 35 U.S.C. 154(b) by 610 days.

(21) Appl. No.: 11/909,751

(22) PCT Filed: Jun. 2, 2006

(86) PCT No.: PCT/JP2006/311064

§ 371 (c)(1),
(2), (4) Date: Sep. 26, 2007

(87) PCT Pub. No.: WO2006/129782

PCT Pub. Date: Dec. 7, 2006

(65) Prior Publication Data

US 2009/0009145 A1    Jan. 8, 2009

(30) Foreign Application Priority Data

Jun. 2, 2005 (JP) .............................. 2005-162252

(51) Int. Cl.
*H02J 7/00* (2006.01)
(52) U.S. Cl. ...................................... 320/166; 320/167
(58) Field of Classification Search ................. 320/166, 320/167
See application file for complete search history.

(56) References Cited

U.S. PATENT DOCUMENTS

2007/0194759 A1* 8/2007 Shimizu et al. ............. 320/166

2009/0033294 A1* 2/2009 Odajima et al. ............. 320/166

FOREIGN PATENT DOCUMENTS

| JP | 05-116571 | 5/1993 |
|---|---|---|
| JP | 11-289684 A | 10/1999 |
| JP | 2004-282846 A | 10/2004 |
| JP | 2005-057863 A | 3/2005 |
| JP | 2005-278302 A | 10/2005 |
| JP | 2006-166542 A | 6/2006 |

OTHER PUBLICATIONS

International Search Report for Application No. PCT/JP2006/311064 dated Aug. 1, 2006.

* cited by examiner

*Primary Examiner*—Edward Tso
*Assistant Examiner*—Samuel Berhanu
(74) *Attorney, Agent, or Firm*—RatnerPrestia

(57) ABSTRACT

A charging apparatus suppresses rise in temperature of an internal chip of a charging element. The output signal obtained from a current detecting portion for detecting charging current to a capacitor and from a voltage detecting portion for detecting a difference between a voltage (VC) of capacitor and a voltage corresponding to DC power supply is integrated by integrator. The charging is carried out by controlling power of a charging element to a predetermined value using an output signal of the integrator and at a time near the completion of the charging, the charging element is controlled by constant-voltage-control-circuit so as to charge the capacitor up to a predetermined voltage. Consequently, the maximum temperature inside the charging element is reduced, thereby providing a charging apparatus with high reliability.

12 Claims, 12 Drawing Sheets

US 7,855,533 B2

CHARGING APPARATUS

This Application is a U.S. National Phase Application of PCT International Application PCT/JP2006/311064.

TECHNICAL FIELD

The present invention relates to a charging apparatus for charging a capacitor rapidly.

BACKGROUND ART

In recent years, development of hybrid cars and electric vehicles has been advanced rapidly and accompanied by this, a braking method of a vehicle has been changed from a conventional mechanical hydraulic control method to an electric hydraulic control method, so that a variety of control methods have been proposed.

Generally, the battery is used as a power supply in order to control hydraulic pressure of a vehicle electrically. In that case, if no other thing but the battery is provided, hydraulic control cannot be performed when supply of electricity is interrupted for some reason, so that braking of the vehicle is disabled.

Therefore, there has been proposed a charging apparatus equipped with a so-called auxiliary power supply in order to cope with an emergency by equipping a large-capacity capacitor or the like as the auxiliary power supply in addition to the battery.

It is very important for the auxiliary power supply for use in braking the vehicle to supply electricity securely in an emergency and the capacitor needs to be charged rapidly from a capacitor discharging state at the time of engine start to a predetermined voltage.

As a background art document relating to this application, for example, Unexamined Japanese Patent Publication No. 5-116571 is known concerning a charging apparatus for battery auxiliary capacitor for engine start.

In the conventional charging apparatus for braking of the vehicle, more specifically, a capacitor having a capacitance of several tens Farads after the engine is started is required to be charged rapidly up to a predetermined voltage in a relatively short time of about 100 seconds.

FIG. 13 shows an example of the conventional charging apparatus which charges with a constant current. This circuit operation is as follows. That is, charging current I is supplied from a constant voltage source V to capacitor 2 having a capacitance of several tens Farads through charging element 1 attached to a radiator plate (not shown). Charging current I is detected by current detecting portion 3 and converted to voltage V3, and then inputted to first input terminal 4a of constant-current-control-circuit 4. Reference voltage 5 is supplied to second input terminal 4b of constant-current-control-circuit 4. A voltage corresponding to a difference between voltage V3 detected by current detecting portion 3 and reference voltage 5 is taken out to output terminal 4c of constant-current-control-circuit 4. That is, constant-current-control-circuit 4 amplifies a difference between voltages inputted to first input terminal 4a and second input terminal 4b. Voltage V4 taken out from output terminal 4c of constant-current-control-circuit 4 is fed back to a control terminal side of charging element 1 through resistor 6. Consequently, charging current I flowing to charging element 1 is controlled to a constant level so that capacitor 2 is charged up to a substantially equal voltage to constant voltage source V.

FIG. 14A, FIG. 14B and FIG. 14C show change over time of each characteristic of the conventional charging apparatus shown in FIG. 13. The abscissa axis of FIGS. 14A to 14C shows charging time t. A charge start time is indicated with t0 and a charge completion time is indicated with t2 (≈100 seconds). The ordinate axis of FIGS. 14A to 14C shows various characteristics. The ordinate axis of each of FIGS. 14A, 14B and 14C indicates change over time in charging voltage VC and charging current I of capacitor 2, loss power W consumed by charging element 1, surface temperature TH of charging element 1 and internal temperature Tjc of charging element 1.

When charging is started at charge start time t0 in FIG. 14A, charging current I of a specified value flows to capacitor 2 as shown in FIG. 14A because the charging apparatus shown in FIG. 13 is a type which executes constant current control. Consequently, charging voltage VC of capacitor 2 rises with time and becomes substantially equal to a voltage of constant voltage source V at charge completion time t2.

FIG. 14B shows change over time in loss power W consumed by charging element 1 in charging process. That is, because no charging voltage VC is applied to capacitor 2 at an initial stage of charging, a voltage of constant voltage source V is applied to charging element 1. After that, as the progress of charging, charging voltage VC of capacitor 2 rises and a voltage applied to charging element 1 lowers. Thus, loss power W indicates a maximum value at charge start time t0 as shown in FIG. 14B and after that, it lowers as the charging progresses.

FIG. 14C shows change in temperature of charging element 1 during charging. In charging element 1 originally at room temperature TO, internal temperature Tjc thereof rises due to generation of heat by loss power W. According to this change, surface temperature TH of charging element 1 rises.

However, as evident from FIG. 14B, loss power W lowers gradually as a charging time passes. Thus, as shown in FIG. 14C, internal temperature Tjc of charging element 1 indicates a maximum value Tjcmax at time t1 and internal temperature Tjc thereafter lowers with passage of time t. According to this change, surface temperature TH of charging element 1 shows similar temperature change.

A problem caused by such a temperature change is that the inside of charging element 1 is placed under a high temperature condition by loss power W. In a word, every time the vehicle is started, the inside of charging element 1 receives a thermal shock.

DISCLOSURE OF THE INVENTION

The present invention provides a charging apparatus that overcomes conventional inconvenience and has high reliability.

The charging apparatus includes: a constant-voltage-control-circuit for controlling a charging voltage to a capacitor to be constant; a current detecting portion for detecting a charging current in a charging path from a direct current power supply to the capacitor; a voltage detecting portion for detecting a difference between a voltage of the capacitor and a voltage corresponding to the direct current power supply; and an integrator for integrating output signals from the current detecting portion and the voltage detecting portion, wherein power of the charging element is controlled to be a predetermined value using an output signal outputted from the integrator to charge the capacitor, and at a time near the completion of charging, the charging element is controlled by the constant-voltage-control-circuit to charge the capacitor up to a predetermined voltage.

Further, another charging apparatus according to the present invention is a charging apparatus having a charging element connected in series between a direct current power supply and a capacitor for charging the capacitor with the direct current power supply through the charging element. The charging apparatus includes: a constant-voltage-control-circuit for controlling a charging voltage to the capacitor to be constant; a current detecting portion for detecting a charging current in a charging path from the direct current power supply to the capacitor; a current limiting portion for controlling a charging current to the capacitor; a voltage detecting portion for detecting a difference between a voltage of the capacitor and a voltage corresponding to the direct current power supply; and an integrator for integrating output signals from the current detecting portion and the voltage detecting portion, wherein capacitor is charged by controlling power of the charging element to a predetermined value using an output signal of the integrator, and at a time near the completion of charging, the current limiting portion charges the capacitor to a predetermined voltage by limiting the maximum value of the charging current and then the constant-voltage-control-circuit charges the capacitor up to a predetermined voltage by controlling the charging element.

Still another charging apparatus according to the present invention is a charging apparatus having a charging element connected between a direct current power supply and a capacitor for charging the capacitor with the direct current power supply through the charging element. The charging apparatus includes: a constant-current-control-circuit for controlling a charging current to the capacitor to be constant; a constant-voltage-control-circuit for controlling a charging voltage to the capacitor; a capacitor voltage detecting portion for detecting a voltage of the capacitor; and a current switching portion for switching a current in the constant-current-control-circuit to a plurality of currents, wherein when the charging element is controlled using an output signal of the constant-current-control-circuit, the plurality of charging currents are switched based on an output of the capacitor voltage detecting portion to charge the capacitor so that average power of the charging element in charging process is constant, and at a time near the completion of charging, the capacitor is charged up to a predetermined voltage by controlling the charging element with the constant-voltage-control-circuit.

In the charging apparatus according to the present invention, constant power is applied to the charging element with such a configuration, so that the internal temperature of the charging element loaded on the charging apparatus rises mildly. Consequently, the rise in the internal temperature of the charging element can be prevented. Because the internal temperature of the charging element can be suppressed to a low level, thermal shock generated each time when a vehicle is started can be reduced, thereby improving reliability of the charging element.

REFERENCE MARKS IN THE DRAWINGS

Figure 1:
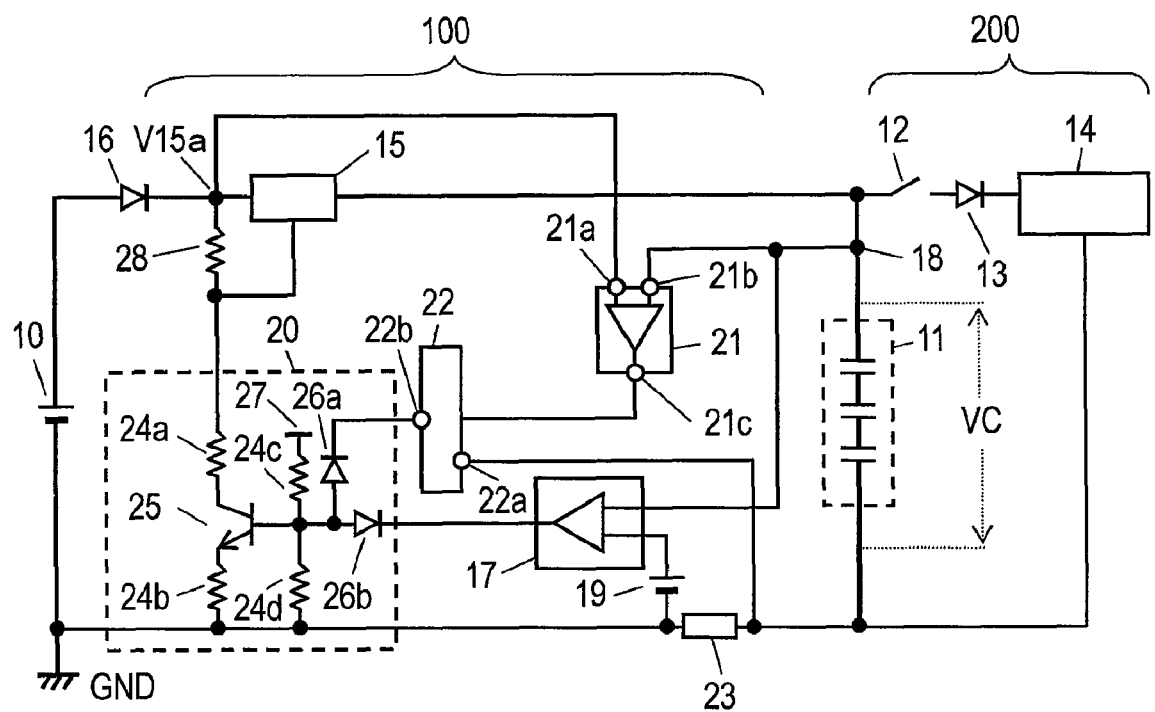
FIG. 1 is a block circuit diagram of a charging apparatus according to a first embodiment of the present invention.

10: DC power supply
11: capacitor
12, 45, 50a, 50b: switch
15, 49: charging element
17: constant-voltage-control-circuit 20: control synthetic circuit
21: voltage detecting portion
22: integrator
23: current detecting portion
37: power switching portion
40: current limiting portion
42: capacitor voltage detecting portion
43: current switching portion
46: constant-current-control-circuit
51: switch drive portion
100: charging apparatus

PREFERRED EMBODIMENTS FOR CARRYING OUT OF THE INVENTION

Hereinafter, preferred embodiments for carrying out the present invention will be described with reference to the drawings.

First Embodiment

FIGS. 1 to 3C concern a first embodiment of the present invention.

Figure 2:
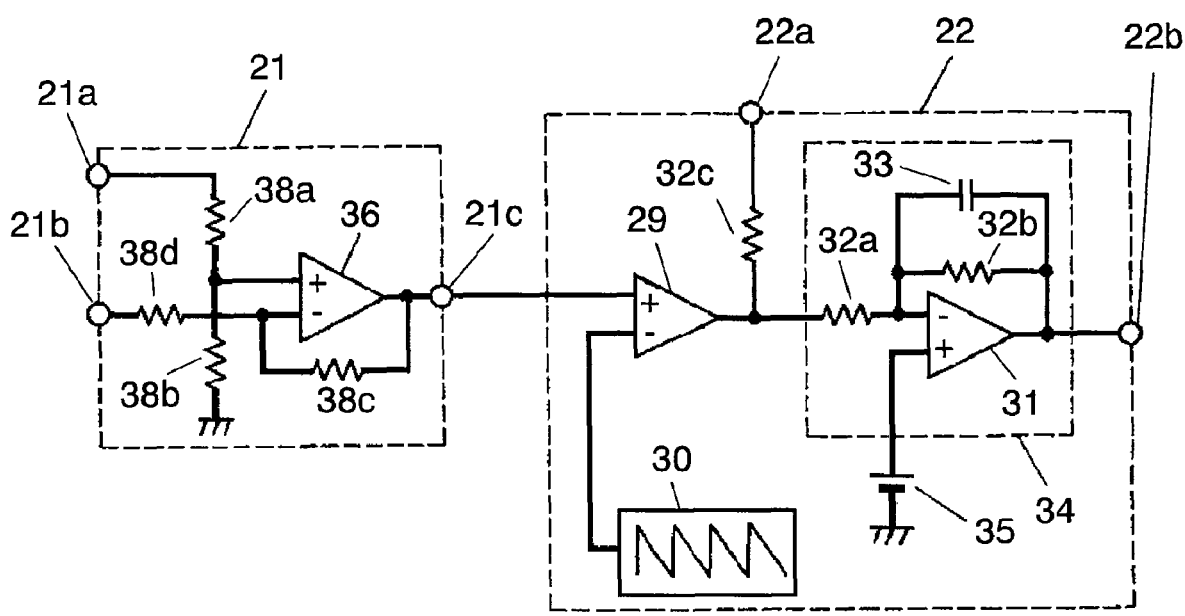
FIG. 2 is a circuit diagram of a voltage detecting portion and an integrator of the charging apparatus according to the first embodiment of the present invention.
Figure 3A:
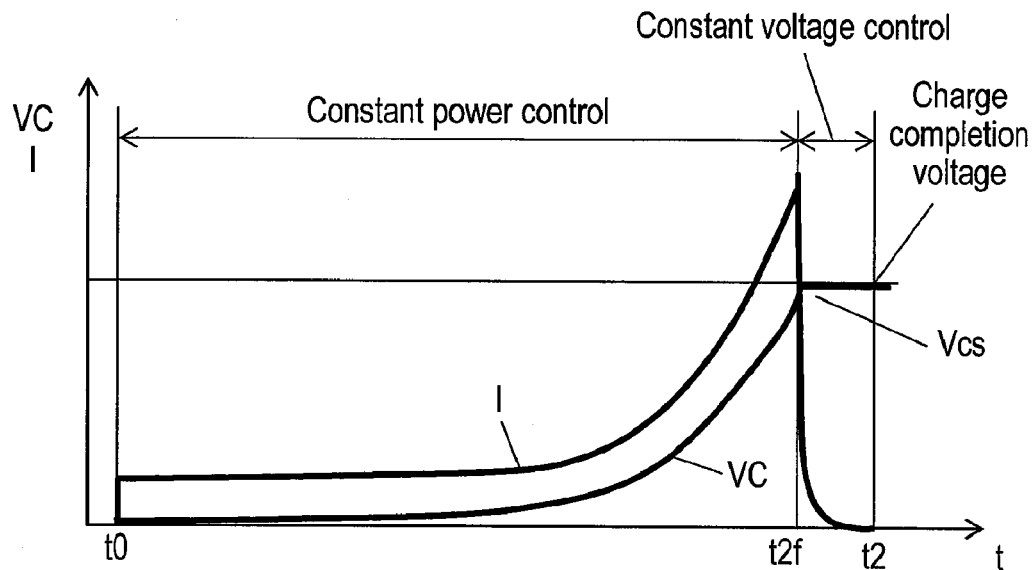
FIG. 3A shows change over time in capacitor charging current and voltage during a charging operation of the charging apparatus according to the first embodiment of the present invention.
Figure 3B:
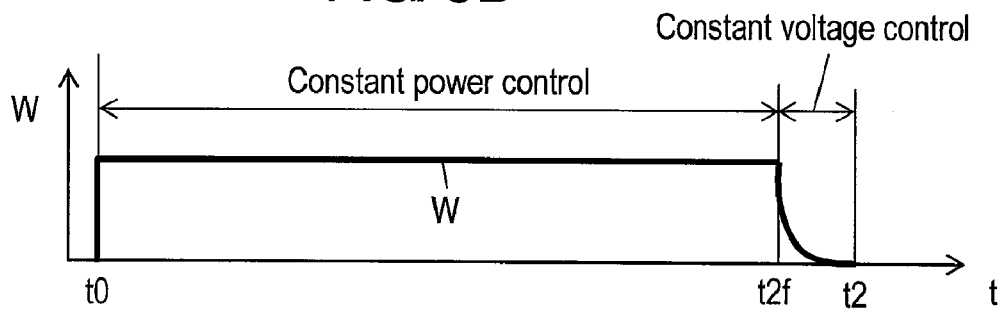
FIG. 3B shows change over time in loss power of the charging element according to the first embodiment of the present invention.
Figure 3C:
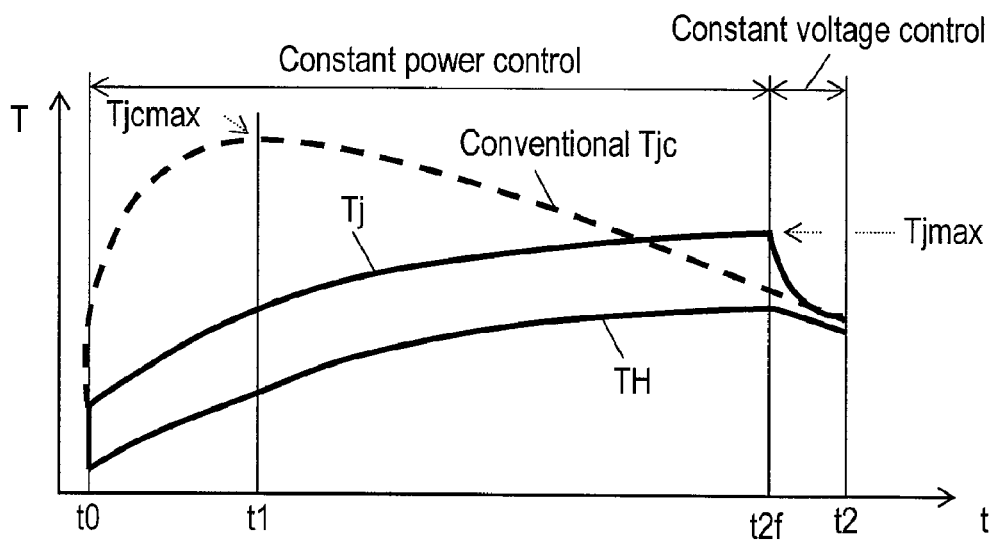
FIG. 3C shows change over time in internal temperature and surface temperature of the charging element according to the first embodiment of the present invention.

FIG. 1 is a block circuit diagram of a charging apparatus. FIG. 2 is a circuit diagram of a voltage detecting portion and an integrator of the charging apparatus. FIG. 3A shows change over time in charging current of a capacitor and voltage generated in the capacitor. FIG. 3B shows change over time in loss power of a charging element. FIG. 3C shows change over time in internal temperature and surface temperature of the charging element.

In FIG. 1, DC (direct current) power supply 10 and capacitor 11 are connected to charging apparatus 100. DC power supply 10 supplies charging apparatus 100 with electric power, and electric charge is accumulated in capacitor 11 by electric power of DC power supply 10.

Capacitor 11 is constructed of an electric double layer capacitor. Consequently, not only rapid charging is enabled but also large electric power can be discharged for the braking of a vehicle in an emergency.

In the meantime, the charging apparatus in the first embodiment adopts the electric double layer capacitor because it is exemplified as the one for use in braking of a vehicle. However, the capacitor according to the present invention is not limited thereto, and may be a capacitor which is ordinarily used in general charging applications.

Backup circuit 200 formed of electronic devices 14 such as switch 12, diode 13 and vehicle braking device is connected to charging apparatus 100. When supply of electric power from DC power supply 10 to charging apparatus 100 is turned off, switch 12 is closed by a signal of a sensor circuit (not shown) for detecting a fall in voltage of DC power supply 10 and charge of capacitor 11 is supplied to electric device 14 through diode 13.

Next, the detailed structure of charging apparatus 100 will be described. Charging element 15 controls current for accumulating charges in capacitor 11. Charging element 15 is mounted on, e.g., a radiator plate (not shown) and provided on a connecting path between DC power supply 10 and capacitor 11. To prevent backward current from flowing into DC power supply 10, an anode of diode 16 is connected to DC power supply 10 side and its cathode is connected to charging element 15.

A voltage appearing at terminal 18, that is, voltage VC generated at both terminals of capacitor 11 and reference voltage 19 are inputted to two input terminals of constant-voltage-control-circuit 17. A voltage differentially amplified by constant-voltage-control-circuit 17 is inputted to control synthetic circuit 20. An output terminal of control synthetic circuit 20 is connected to charging element 15 connected to capacitor 11. Consequently, the charging voltage to capacitor 1 can be maintained constant. The circuit operation of constant-voltage-control-circuit 17 will be described later.

Voltage detecting portion 21 includes first input terminal 21a and second input terminal 21b. A voltage inputted to charging element 15, that is, input voltage V15a corresponding to DC power supply 10 is inputted to first input terminal 21a. A voltage of terminal 18, that is, voltage VC of capacitor 11 is inputted to second input terminal 21b. Voltage detecting portion 21 detects a voltage which is a difference between the two and further amplifies its magnitude and outputs the same to output terminal 21c. The output voltage taken out from output terminal 21c of voltage detecting portion 21 is inputted to integrator 22.

Although current detecting portion 23 is usually constructed of a resistor, it may be a current sensor which outputs a voltage proportional to a current, and converts a charging current, which flows through a charging path from DC power supply 10 to capacitor 11, to a voltage. The voltage taken out from current detecting portion 23 is inputted to integrator 22 through terminal 22a.

Integrator 22 integrates voltages of both voltage detecting portion 21 and current detecting portion 23 to calculate electric power. An output voltage of integrator 22 is inputted to control synthetic circuit 20 through terminal 22b. The detailed operation of integrator 22 will be described later.

Control synthetic circuit 20 is constituted of resistors 24a to 24d, transistor 25, and diodes 26a and 26b. A terminal of each of resistors 24a and 24b is connected to a collector and an emitter of transistor 25. The other terminals of resistors 24a and 24b are connected to resistor 28 and a grounding terminal (GND). A base voltage determined by division by resistors 24c, 24d is applied to the base of transistor 25. Diodes 26a and 26b are connected to the base of transistor 25. Diodes 26a and 26b constitute a so-called OR circuit.

That is, on the input side of control synthetic circuit 20, diodes 26a and 26b are connected to integrator 22 and constant-voltage-control-circuit 17 separately to construct an OR circuit. Thus, control synthetic circuit 20 is controlled by any one operation of integrator 22 and constant-voltage-control-circuit 17.

Control synthetic circuit 20 drives transistor 25 according to a current supplied through resistor 24c connected to internal power supply 27 and controls charging element 15 through resistor 28 connected between other terminal of resistor 24a and charging element 15. The control of base voltage of transistor 25 is determined by cathode voltages of diodes 26a and 26b which configures an OR circuit.

FIG. 2 shows specific circuit structures of voltage detecting portion 21 and integrator 22 shown in FIG. 1. Integrator 22 is formed of comparator 29, sawtooth generator 30 for generating a stabilized frequency and voltage, smoothing device 34 including amplifier 31, resistors 32a, 32b and capacitor 33, and reference voltage 35.

Voltage detecting portion 21 is connected to integrator 22 through terminal 21c. Voltage detecting portion 21 is formed of differential amplifier 36, resistors 38a, 38b, 38c, 38d and terminals 21a, 21b, 21c. The input side voltage of charging element 15 through terminal 21a is divided by resistors 38a, 38b and supplied to a non-inverting input terminal (+) of differential amplifier 36.

Voltage VC of capacitor 11, that is, a voltage of terminal 18 is inputted to an inverting input terminal (−) of differential amplifier 36 through terminal 21b and resistor 38d. Negative feedback resistor 38c is connected between output terminal 21c of differential amplifier 36 and the inverting input terminal (−). Differential amplifier 36 amplifies both differential voltages inputted to the inverting input terminal (−) and the non-inverting input terminal (+). That is, a voltage proportional to the input voltage inputted to charging element 15 is compared with voltage VC appearing at capacitor 11 and then, a differential voltage between them is amplified and its result is outputted to output terminal 21c The output voltage outputted to output terminal 21c is inputted to the non-inverting input terminal (+) of comparator 29. A sawtooth waveform voltage from sawtooth generator 30 is inputted to the inverting input terminal (−) of comparator 29. Comparator 29 is configured to obtain a difference between both of the voltages. That is, an output of current detecting portion 23 is inputted to smoothing device 34 from terminal 22a during a period when the output voltage of voltage detecting portion 21 is higher than the voltage of sawtooth generator 30.

A signal corresponding to so-called electric power, which is produced by integrating charging current I with a difference of voltage between input voltage V15a of charging element 15 and voltage VC of capacitor 11, is outputted from output terminal 22b of smoothing device 34. The output voltage outputted from output terminal 22b is controlled to be equal to reference voltage 35 and inputted to control synthetic circuit 20. Consequently, the electric power of charging element 15 is controlled to be constant in the charging process.

Figure 14A:
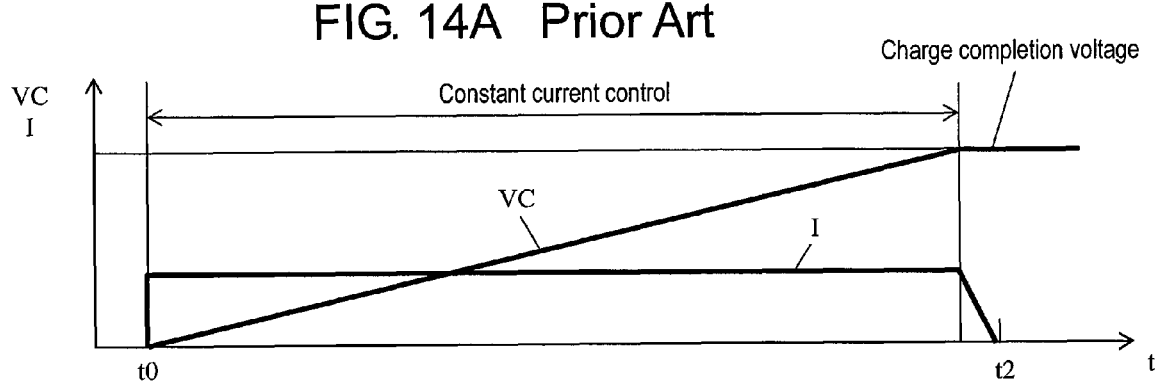
FIG. 14A shows change over time in capacitor charging current and voltage during a charging operation of the conventional charging apparatus.
Figure 14B:
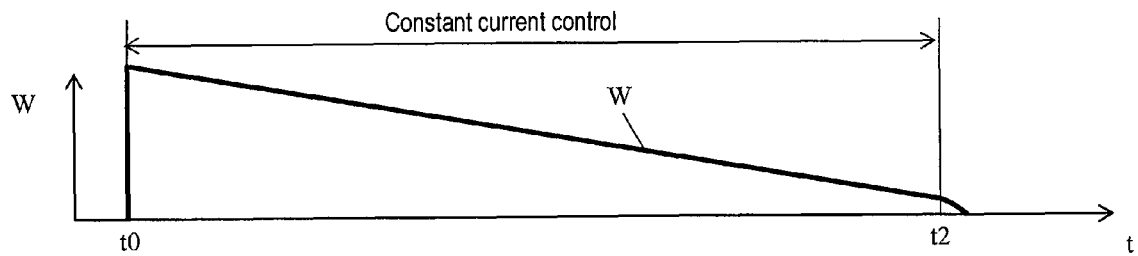
FIG. 14B shows change over time in loss power of a conventional charging element.
Figure 14C:
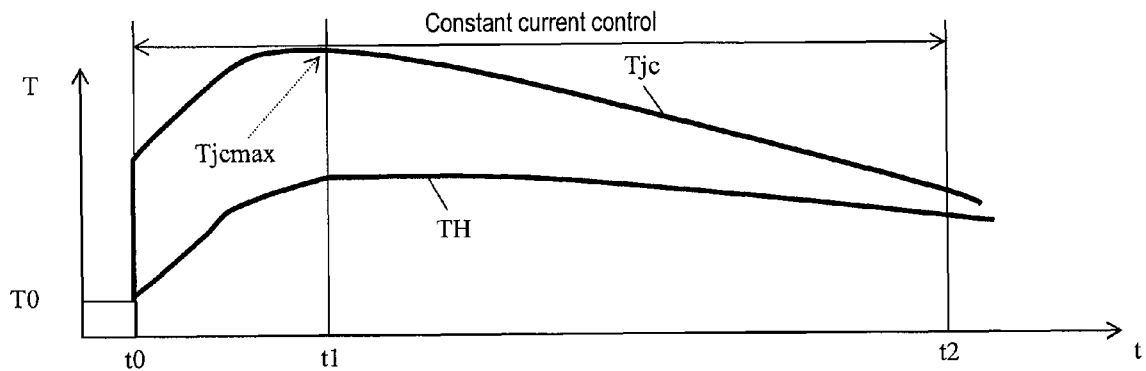
FIG. 14C shows change over time in internal temperature and surface temperature of the conventional charging element.

FIGS. 3A, 3B, and 3C show change over time of the charging apparatus having such a structure. The operating condition for the present invention is set such that the same radiator plate and charging element as the conventional ones are used and the same charge completion time t2 is defined. The abscissa axis and the ordinate axis in FIGS. 3A to 3C are the same as those in FIG. 14 showing a conventional example. That is, the abscissa axis indicates time t. The charge start time is expressed by t0 and the charge completion time is expressed by t2 (≈100 seconds). The ordinate axis indicates various electric characteristics. The axes of ordinate of FIGS. 3A, 3B and 3C indicate charging voltage VC and charging current I of the capacitor 11, loss power W consumed by charging element 15, surface temperature TH of charging element 15 and its internal temperature Tj, respectively.

FIG. 3C shows also change over time in internal temperature Tjc of conventional charging element 1 for comparison. As evident from FIG. 3C, a different point of the first embodiment from FIG. 14 of the conventional example is that surface temperature TH and its internal temperature Tj of charging element 15 are rising mildly in a substantially straight line by controlling loss power W (see FIG. 3B) in the charging process.

Consequently, in the first embodiment, maximum value Tjmax of internal temperature Tj of charging element 15 reaches about 80% conventional maximum value Tjcmax, thereby eliminating a disadvantage that charging element 15 may be exposed to high temperature.

In FIG. 3A, when a voltage of terminal 18 containing a voltage corresponding to an integrated result of internal resistance component and charging current of capacitor 11 comes near constant-voltage-control-voltage Vcs at a time near the charge completion, a voltage lower than output 22b of integrator 22 is outputted in comparison with reference voltage 19 as an output of constant-voltage-control-circuit 17. Because diodes 26a and 26b constituting part of control synthetic circuit 20 are OR-connected, the base voltage of transistor 25 decreases following a lower output voltage inputted from constant-voltage-control-circuit 17. At this time, the collector voltage of transistor 25 rises and consequently, the voltage on both ends of resistor 28 which forward-biases charging element 15 decreases thereby acting to increase the operating impedance of charging element 15. As a result, increase in charging current is limited. Then, as charging of capacitor 11 is progressed (further coming close to a charge completion voltage), the base voltage of transistor 25 decreases gradually. Consequently, the forward bias voltage of charging element 15 decreases so that finally, the voltage of terminal 18 is controlled continuously to constant-voltage-control-voltage Vcs.

As a result, capacitor 11 is charged to a predetermined voltage while excess current is prevented from passing through, so that the constant voltage control operation can be started at time t2. Thus, as shown in FIG. 3A, the charging current increased at time t2f in the vicinity of charge completion time t2 can be reduced gradually.

Time from time t2f to time t2 cannot be uniformly defined from the above-described operation, and as the internal resistance of capacitor 11 increases, an apparent voltage generated at terminal 18 rises depending on the magnitude of the charging current. Thus, although time taken to reach constant-voltage-control-voltage Vcs is shortened, time from time t2f to time t2 increases in contrast, thereby turning to a charging time dependent on the internal resistance of the capacitor.

With the above-described structure and operation, the temperature at which charging element 15 produces heat can be reduced under the conditions of the same charging time, charging element and radiator plate as the conventional ones. As a result, thermal shock, which tends to occur each time when a vehicle is actuated, can be reduced thereby providing a highly reliable charging apparatus.

Second Embodiment

Figure 4:
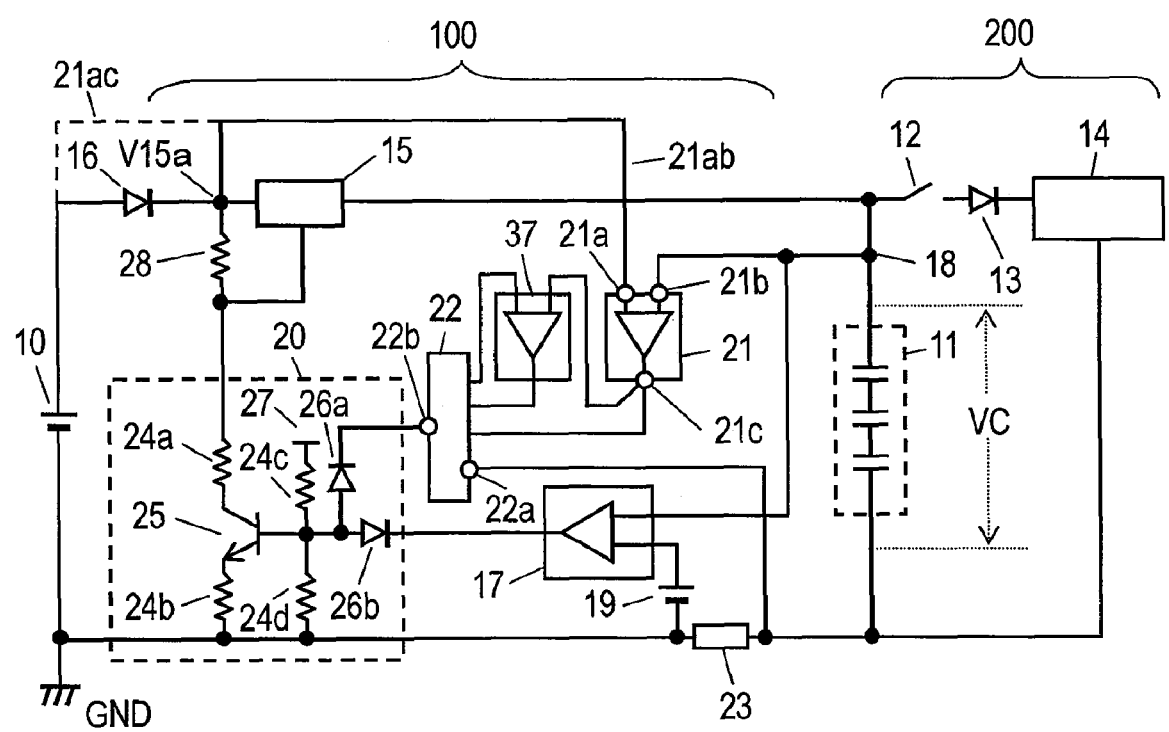
FIG. 4 is a block circuit diagram of a charging apparatus according to a second embodiment of the present invention.
Figure 5:
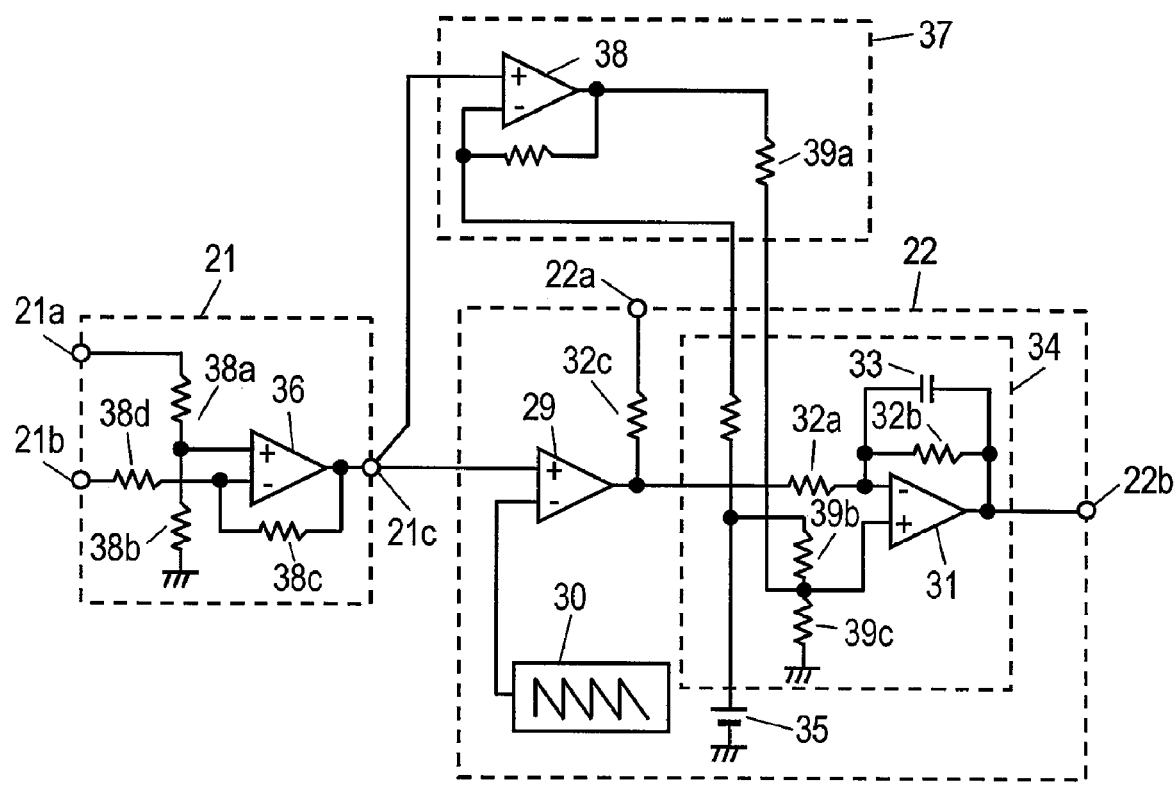
FIG. 5 is a circuit diagram of a voltage detecting portion, a power switching portion and an integrator of the charging apparatus according to the second embodiment of the present invention.
Figure 6A:
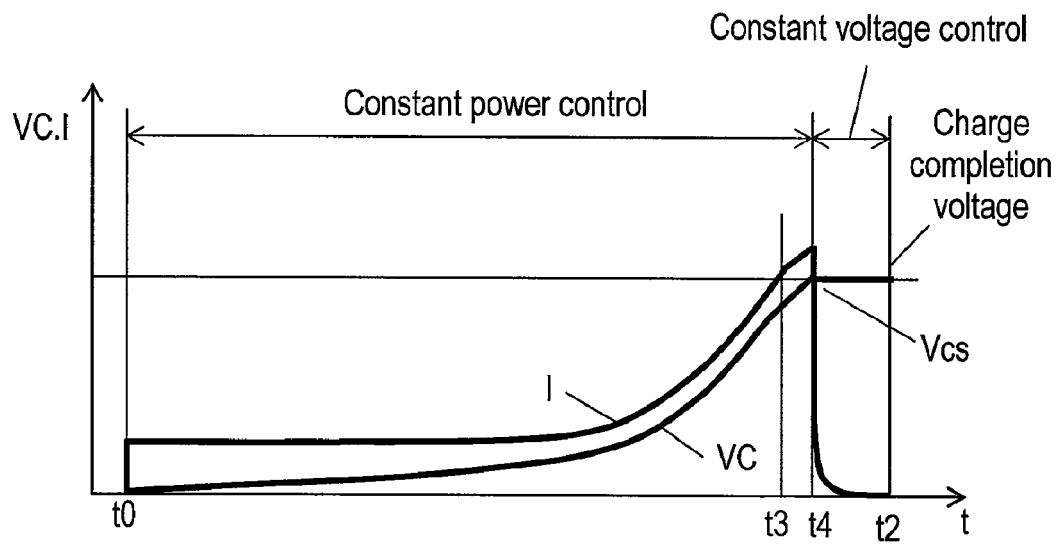
FIG. 6A shows change over time in capacitor charging current and voltage during a charging operation of the charging apparatus according to the second embodiment of the present invention.
Figure 6B:
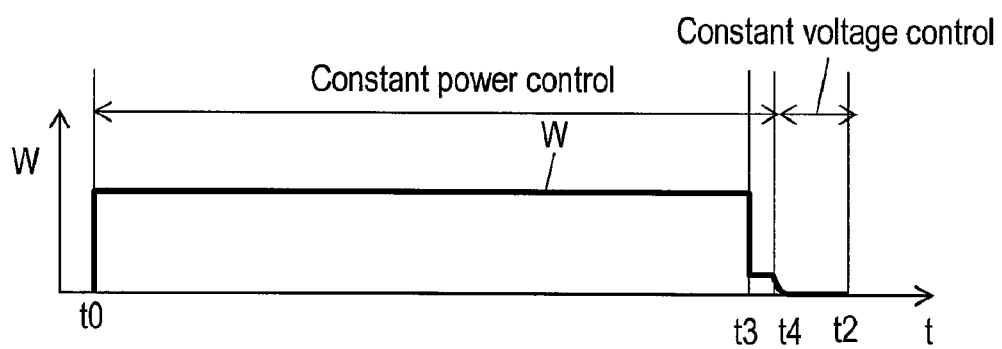
FIG. 6B shows change over time in loss power of the charging element according to the second embodiment of the present invention.
Figure 6C:
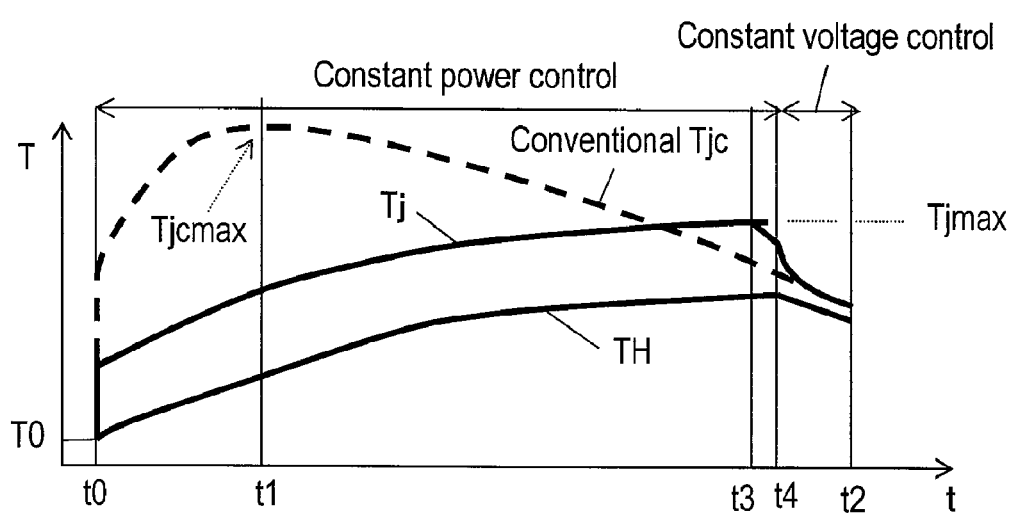
FIG. 6C shows change over time in internal temperature and surface temperature of the charging element according to the second embodiment of the present invention.

FIGS. 4 to 6C show a charging apparatus according to a second embodiment of the present invention. FIG. 5 is a circuit diagram of a voltage detecting portion, a power switching portion and an integrator of the charging apparatus. FIGS. 6A, 6B and 6C show change over time of the charging apparatus during a charging operation. FIG. 6A shows change over time in the charging current and capacitor voltage of the capacitor, FIG. 6B shows change over time in loss power of the charging element and FIG. 6C shows change over time in the internal temperature and surface temperature of the charging element.

In FIGS. 4 and 5, the same reference numerals designate the same components as in FIGS. 1 and 2.

The second embodiment is different from the first embodiment in that power switching portion 37 is connected between terminal 21c of voltage detecting portion 21 and integrator 22.

As shown in FIG. 5, the second embodiment is provided with power switching portion 37 constituted of hysteresis comparator 38 which compares reference voltage 35 with a voltage of terminal 21c of voltage detecting portion 21. Further, the second embodiment is different from the first embodiment in that integrator 22 is provided with resistors 39a, 39b and 39c for switching the reference voltage of smoothing device 34 by the operation of hysteresis comparator 38.

Next, description will be given on an operation of integrator 22 in a charging process to capacitor 11. It is assumed that the charge completion time is t2 (≈100 seconds) in the following description.

First, as shown in FIG. 5, terminal 21c of voltage detecting portion 21 is compared with reference voltage 35 by hysteresis comparator 38, and when an output of terminal 21c becomes larger than a predetermined value determined by reference voltage 35, hysteresis comparator 38 is turned OFF.

With such a structure, an output of smoothing device 34 becomes a power signal based on a voltage obtained by dividing reference voltage 35 with resistors 39b and 39c. The output voltage of smoothing device 34 is inputted to control synthetic circuit 20 through terminal 22b. Consequently, the charging is progressed while loss power W of charging element 15 is controlled to be constant.

FIGS. 6A, 6B and 6C show change over time in the capacitor charging current and voltage, the loss power of the charging element and the internal temperature and surface temperature of the charging element during a charging operation of the charging apparatus.

In FIGS. 5, 6A, 6B and 6C, when time t3 is reached, the output voltage of output terminal 21c of voltage detecting portion 21 turns below a predetermined value which is determined by reference voltage 35, so that hysteresis comparator 38 is turned ON.

As a result, resistors 39a and 39b are connected in parallel to each other, so that an output of smoothing device 34 becomes a power signal, which is determined by a voltage smaller than a voltage obtained by dividing reference voltage 35 with resistors 39b and 39c, whereby loss power W of charging element 15 is controlled to be reduced.

As a result, as shown from time t3 to time t4 in FIG. 6A, charging current I, which increases as the difference between input voltage V15 of charging element 15 and voltage VC of capacitor 11 decreases during the charging process, can be suppressed to be smaller than charging current I in FIG. 3A.

Even when the voltage of DC power supply 10 falls during charging with a constant power so that the difference between input voltage V15a of charging element 15 and voltage VC of capacitor 11 decreases, the increase in charging current I can be suppressed as described above.

After that, when voltage VC of capacitor 11 approaches constant-voltage-control-voltage Vcs at time t4 as in the first embodiment, a voltage from constant-voltage-control-circuit 17 is outputted to control synthetic circuit 20 by priority. Consequently, the charging of capacitor 11 is so progressed as to control charging element 15 gradually with a constant voltage, whereby charging current I is reduced for several seconds.

As a result, by charging capacitor 11 up to a predetermined constant-voltage-control-voltage Vcs while preventing excess current from passing through, the charging operation can be completed at time t2.

With such a structure and operation, the excess current which flows to an electronic component such as a transistor, a diode, a resistor and a capacitor existing in the charging path can be avoided besides the same effect as in the first embodiment, thereby providing a charging apparatus with higher reliability.

In the second embodiment, first terminal 21a of voltage detecting portion 21 is connected electrically to a common connecting point between charging element 15 and diode 16 through connecting line 21ab. However, terminal 21a may be connected to the common connecting point between DC power supply 10 and diode 16 through connecting line 21ac.

In this case, voltage detecting portion 21 measures a voltage at a circuit portion including every circuit component constituting a circuit in which the charging current flows, between DC power supply 10 and capacitor 11. As a result, voltage detecting portion 21 always perform measurement with a voltage of diode 16 contained, and thus total power of circuit components including diode 16 can be controlled to be constant. Consequently, heat generation in a circuit device including diode 16 interposed in the charging path can be suppressed, thereby providing a charging apparatus with very high reliability.

The second embodiment may be so constructed as to measure a difference in voltage including the voltage of current detecting portion 23 with voltage detecting portion 21 by connecting current detecting portion 23 between DC power supply 10 and terminal 18 of capacitor 11.

Consequently, heat generation and charging current in the entire circuit components constituting the charging apparatus including current detecting portion 23 as well as diode 16 can be suppressed, thereby providing a charging apparatus with higher reliability.

Third Embodiment

Figure 7:
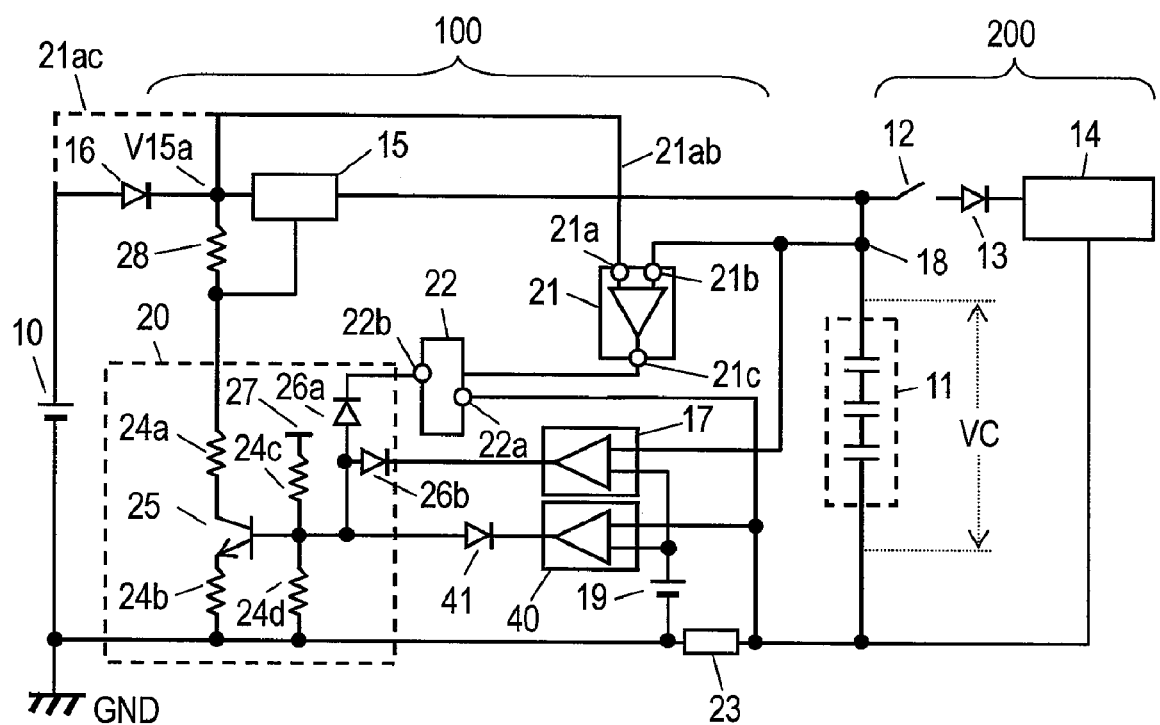
FIG. 7 is a block circuit diagram of a charging apparatus according to a third embodiment of the present invention.
Figure 8A:
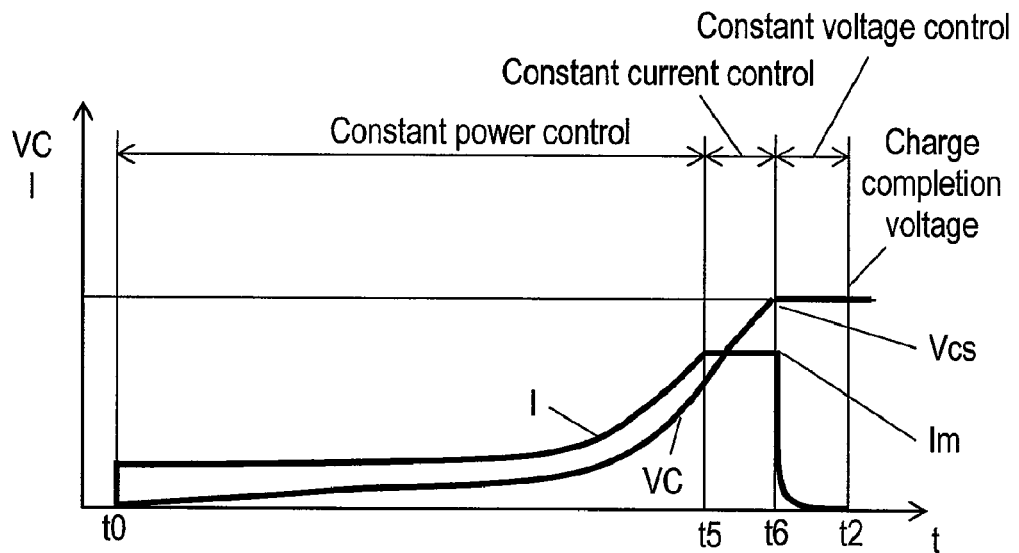
FIG. 8A shows change over time in capacitor charging current and voltage during a charging operation of the charging apparatus according to the third embodiment of the present invention.
Figure 8B:
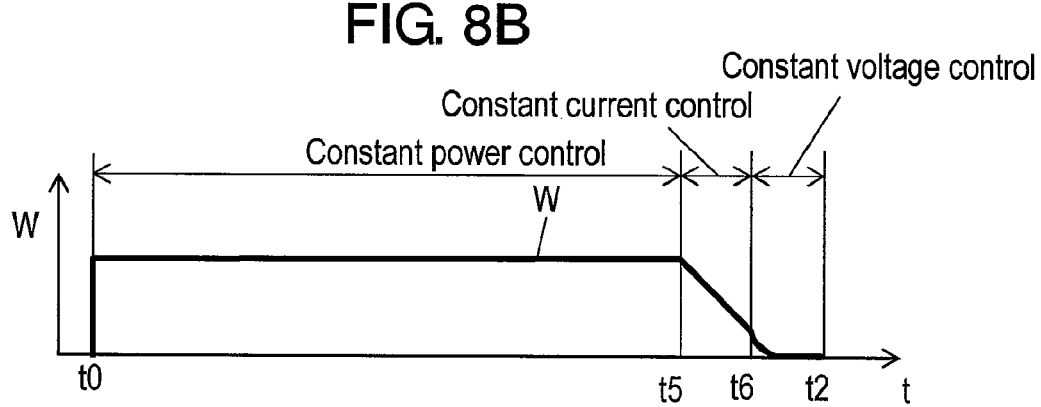
FIG. 8B shows change over time in loss power of the charging element according to the third embodiment of the present invention.
Figure 8C:
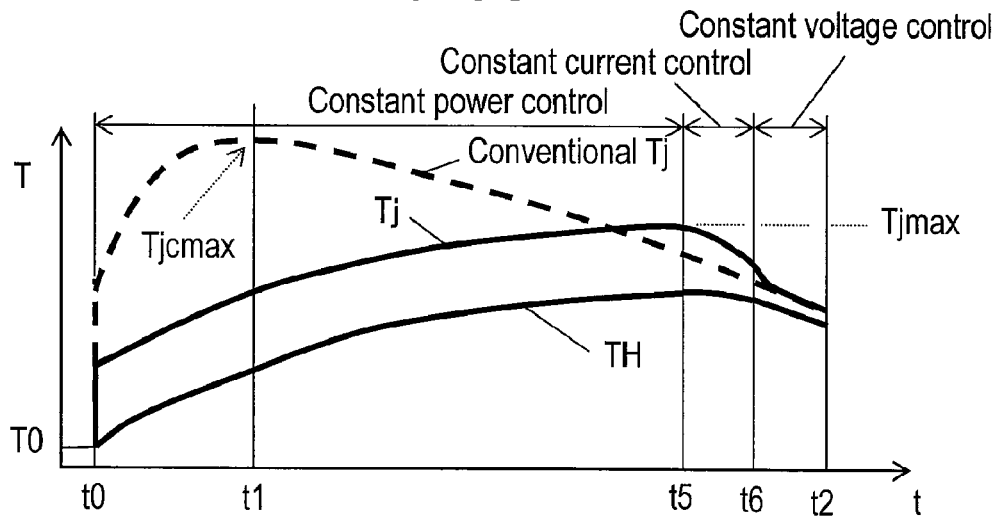
FIG. 8C shows change over time in internal temperature and surface temperature of the charging element according to the third embodiment of the present invention.

FIGS. 7 to 8C show a charging apparatus according to a third embodiment of the present invention.

FIG. 7 is a block circuit diagram of the charging apparatus. FIG. 8A shows change over time in the capacitor charging current and capacitor voltage, FIG. 8B shows change over time in the loss power of the charging element, and FIG. 8C shows change over time in the internal temperature and surface temperature of the charging element.

In FIG. 7, like reference numerals denotes the same components as in FIG. 1. The third embodiment shown in FIG. 7 is provided with current limiting portion 40 and diode 41 in addition to the structure described in the first embodiment. For example, current limiting portion 40 is constructed of a differential amplifier, and a voltage of current detecting portion 23 and reference voltage 19 are provided to each of two inputs of current limiting portion 40 separately. An output terminal of current limiting portion 40 is connected to control synthetic circuit 20 through diode 41. Diode 41 constructs a so-called OR circuit together with diodes 26a and 26b. That is, in the third embodiment, current limiting portion 40 is connected to the input side of control synthetic circuit 20 as well as integrator 22 and constant-voltage-control-circuit 17 to build a new OR circuit structure with these circuit portions.

An operation of the charging apparatus having such a structure will be described with reference to FIGS. 8A to 8C. First, in FIG. 8B, with loss power W of charging element 15 controlled to be constant from charge start time t0 to charge completion time t2 as in the first embodiment, charging from DC power supply 10 to capacitor 11 is progressed. As a result, charging current I is increased as shown in FIG. 8A.

Consequently, the output voltage of current detecting portion 23 is increased. Current limiting portion 40 outputs a signal to control synthetic circuit 20 through diode 41 so that a voltage generated in current detecting portion 23 is equal to reference voltage 19, and thus the charging is progressed with the charging current limited to maximum value Im at time t5.

After that, when capacitor 11 becomes a predetermined constant-voltage-control-voltage Vcs at time t6, charging element 15 is controlled by constant-voltage-control-circuit 17 as in the first embodiment so as to charge capacitor 11 up to a predetermined voltage while preventing excess current from passing through, and then the charging operation is completed at charge completion time t2.

FIG. 8C shows change over time in surface temperature TH and internal temperature Tj of charging element 15 when it is charged in this way. It has been found that maximum temperature Tjmax of surface temperature TH and internal temperature Tj of charging element 15 becomes lower than that of the first embodiment.

With the above described structure and operation, the charging current can be fed to the charging apparatus with circuit components constituting the charging path kept within a rated current range, and thus maximum temperature Tjmax within charging element 15 can be reduced further, thereby providing a charging apparatus with higher reliability.

In the third embodiment, connecting line 21ab to be connected to terminal 21a of voltage detecting portion 21 may be connected to a common connecting point between DC power supply 10 and diode 16 as shown with a connecting line 21ac (see FIG. 7), not to the common connecting point between diode 16, charging element 15 and resistor 28. Consequently, the output voltage measured at voltage detecting portion 21 becomes a voltage of a circuit portion including every circuit component constituting a circuit in which the charging current flows between DC power supply 10 and capacitor 11, including diode 16, thereby making it possible to suppress heat generation in the circuit components such as a transistor, a diode, a resistor and a capacitor disposed at the charging path, so as to provide a charging apparatus with high reliability.

Diode 16 may be attached to a radiator plate (not shown) to which charging element 15 is attached. Consequently, heat generated in charging element 15 and diode 16 may be radiated to the radiator plate effectively, so that maximum temperature Tjmax within charging element 15 can be reduced further.

Fourth Embodiment

Figure 9:
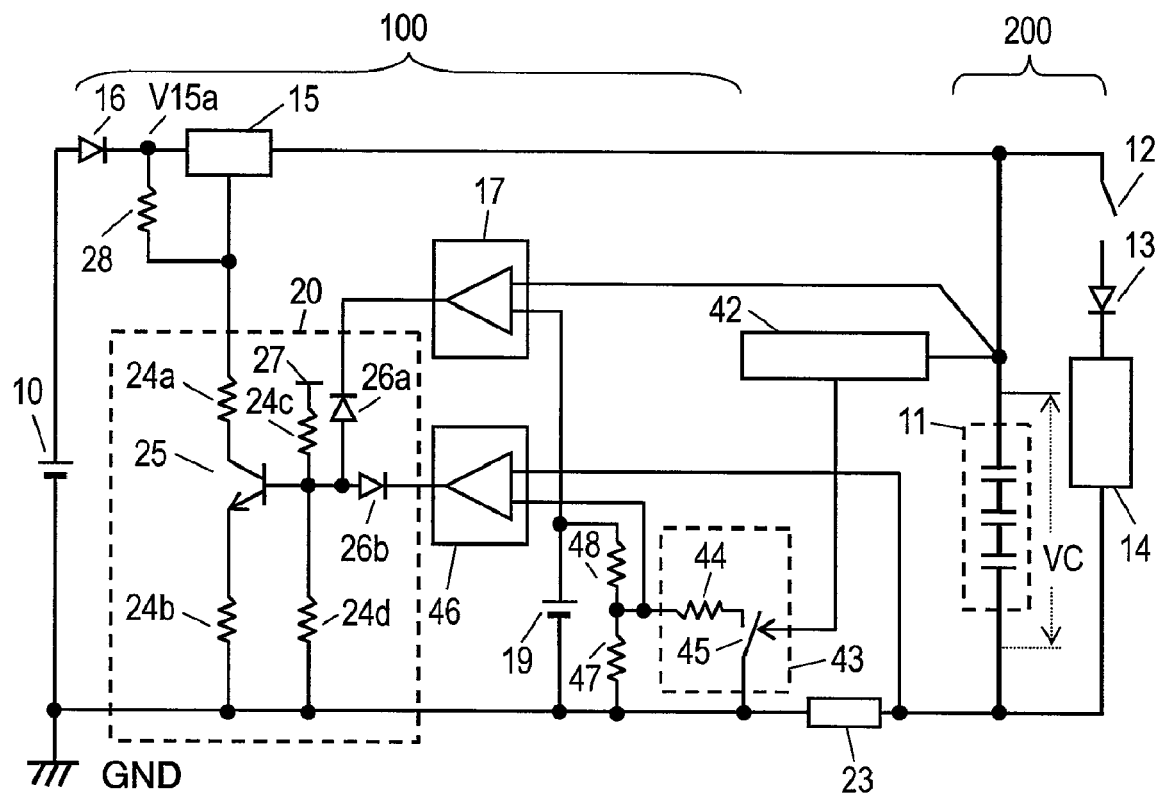
FIG. 9 is a block circuit diagram of a charging apparatus according to a fourth embodiment of the present invention.
Figure 10A:
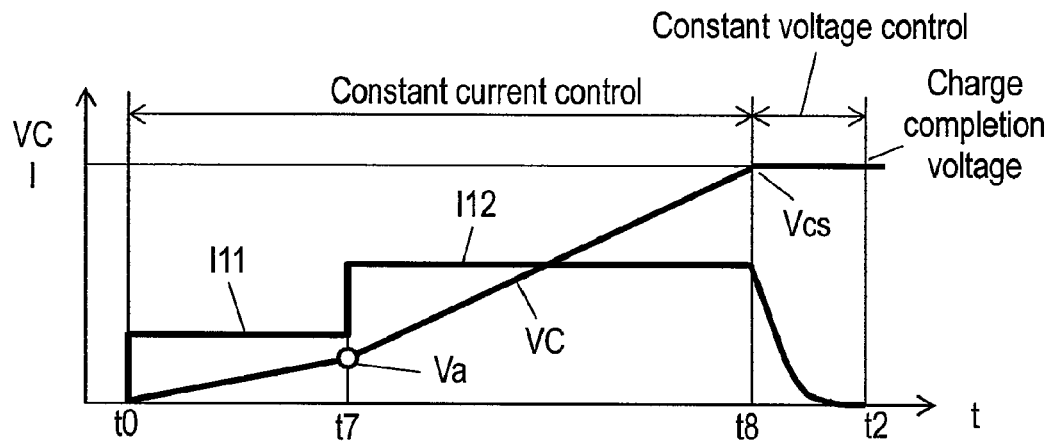
FIG. 10A shows change over time in capacitor charging current and a capacitor voltage during a charging operation of the charging apparatus according to the fourth embodiment of the present invention.
Figure 10B:
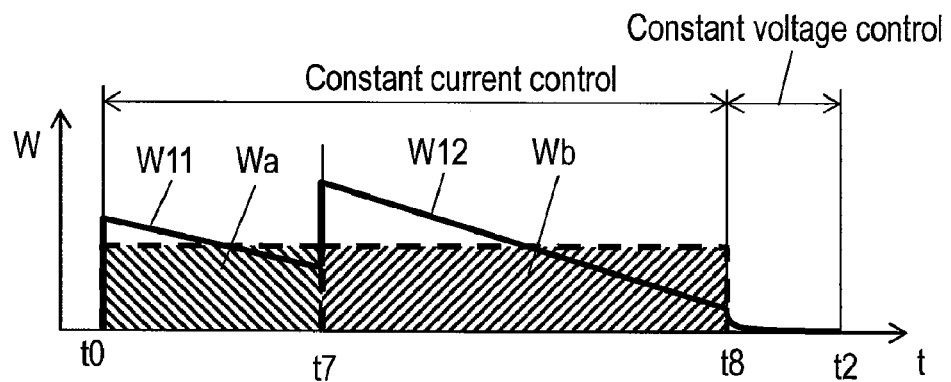
FIG. 10B shows change over time in loss power of the charging element according to the fourth embodiment of the present invention.
Figure 10C:
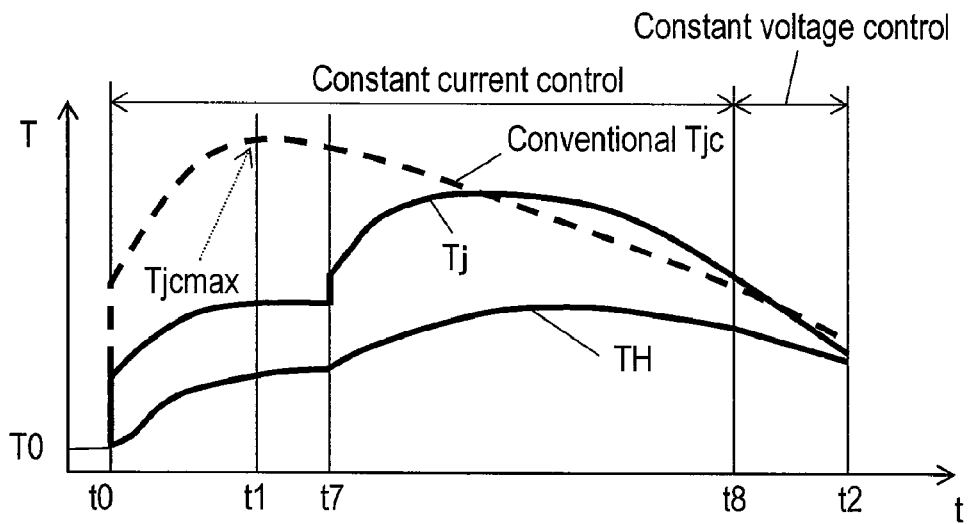
FIG. 10C shows change over time in element internal chip temperature and element surface temperature according to the fourth embodiment of the present invention.

FIGS. 9 to 10C show a charging apparatus according to a fourth embodiment of the present invention.

Hereinafter, the fourth embodiment of the present invention will be described with reference to the drawings. FIG. 9 is a block circuit diagram of the charging apparatus. FIG. 10A shows change over time in the capacitor charging current and capacitor voltage, FIG. 10B shows change over time in the loss power of the charging element, and FIG. 10C shows change over time in the internal temperature and surface temperature of the charging element.

In FIG. 9, like reference numerals denote the same components as in FIG. 7. In FIG. 9, capacitor voltage detecting portion 42 detects a voltage at capacitor 11 and outputs an ON/OFF signal corresponding to the voltage. Current switching portion 43 is so constructed as to change the charging current by turning ON/OFF switch 45 connected to resistor 44 by receiving an output signal from capacitor voltage detecting portion 42.

Capacitor voltage detecting portion 42 and current switching portion 43 are constructed of a microcomputer. That is, voltage VC of capacitor 11 is detected as a digital signal by an A/D converter (not shown) incorporated in the microcomputer. Whether or not predetermined voltage Va described later has been attained is determined by the micro computer using this digital signal, and switch 45 of current switching portion 43 is switched corresponding to the result of that determination. With this structure, capacitor voltage detecting portion 42 and current switching portion 43 can be simplified and reduced in size. Current/voltage conversion voltage and reference voltage 19 are provided to constant-current-control-circuit 46 from current detecting portion 23, and its output voltage is inputted to control synthetic circuit 20.

Next, an operation of the circuit having such a structure will be described with reference to FIGS. 10A to 10C.

In FIG. 10A, a signal for turning ON switch 45 of current switching portion 43 is outputted from capacitor voltage detecting portion 42 until voltage VC of capacitor 11 reaches predetermined voltage Va at time t7. A voltage on the reference side of constant-current-control-circuit 46 is set to a voltage obtained by dividing reference voltage 19 with a parallel resistor comprised of resistor 44 and resistor 47, and resistor 48, and consequently, the charging current acts to become constant current I11.

In FIGS. 10A to 10C, when voltage VC of capacitor 11 rises over predetermined voltage Va at time t7, a signal for turning OFF switch 45 is outputted from capacitor voltage detecting portion 42, so that the current is switched to current I12.

After that, when the capacitor voltage approaches constant-voltage-control-voltage Vcs at time t8, a voltage signal from constant-voltage-control-circuit 17 is inputted to control synthetic circuit 20 by priority and the charging current is reduced so as to charge capacitor 11 while preventing excess current from passing through, and then the charging is completed at charge completion time t2.

Next, setting of the above-described charging currents I11, I12 and predetermined voltage Va will be described with reference to FIGS. 10B and 10C.

FIGS. 10B and 10C show loss power and heat generation of charging element 15 when capacitor 11 is charged from DC power supply 10 using the radiator plate and charging element as conventionally used ones by switching the charging current so that the charging is completed within the same charging time t2 ($\approx$100 seconds). Loss power of charging element 15 is expressed by W11, W12.

FIG. 10B shows setting of charging currents I11, I12 and predetermined voltage Va so that average power Wa (indicated by rightward falling oblique lines) obtained by averaging loss power W11 from charge start time t0 to time t7 during charging process with the time from charge start time t0 to time t7 and average power Wb (indicated by leftward falling oblique lines) obtained by averaging loss power W12 from time t7 to time t8 during the charging process with the time from time t7 to t8 are substantially constant.

Although heat generation in charging element 15 from charge start time t0 to charge completion time t2 occurs in two stages as shown in FIG. 10C by switching the charging current in a step-like manner, any condition can be eliminated such a disadvantage that maximum temperature Tjcmax of internal temperature Tjc of conventional charging element 1 is exceeded.

With the above-described structure and operation, maximum temperature Tjmax (maximum value of the internal temperature Tj) within charging element 15 can be reduced under the same condition of the charging time, charging element and radiator plate as in the conventional apparatus, thereby providing a charging apparatus with high reliability. The fourth embodiment has been described that the switching of current is performed in two steps. However, it is possible to switch the current in two or more steps depending on a factor such as difference in heat transfer characteristic due to the shape of the radiator plate.

Fifth Embodiment

Figure 11:
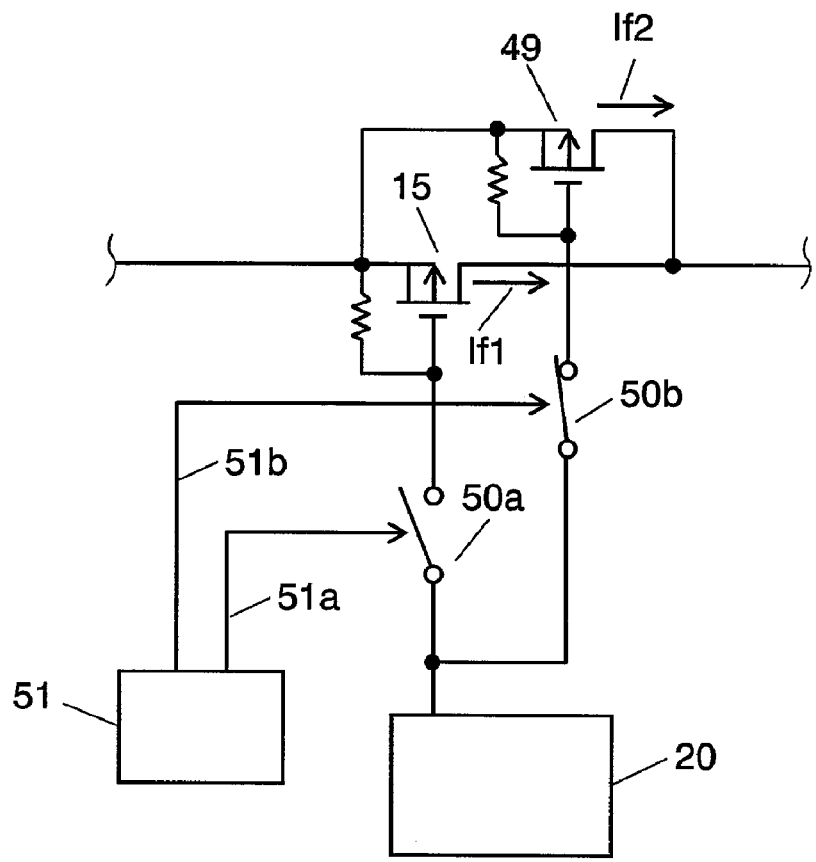
FIG. 11 is a block circuit diagram of a charging element and its vicinity of a charging apparatus according to a fifth embodiment of the present invention.
Figure 12:
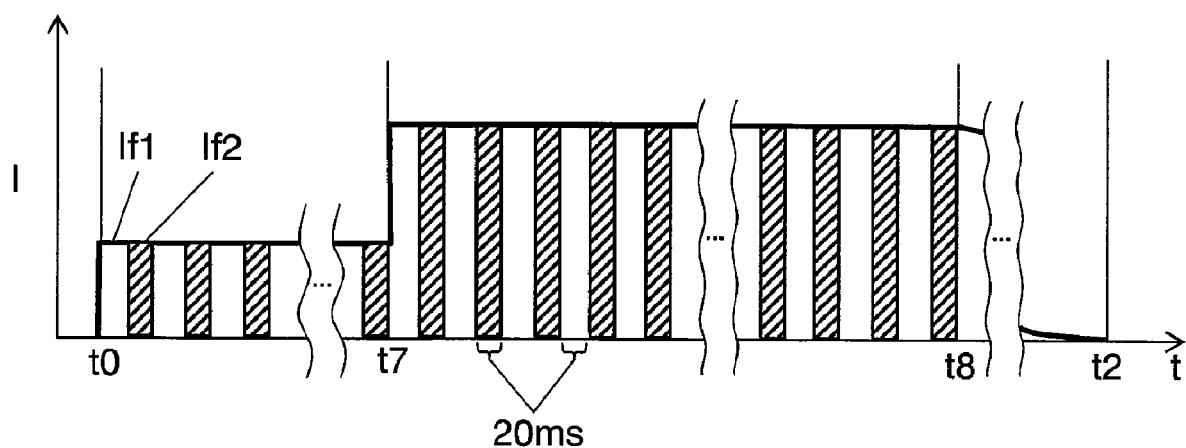
FIG. 12 shows change over time in capacitor charging current of the charging apparatus according to the fifth embodiment of the present invention.
Figure 13:
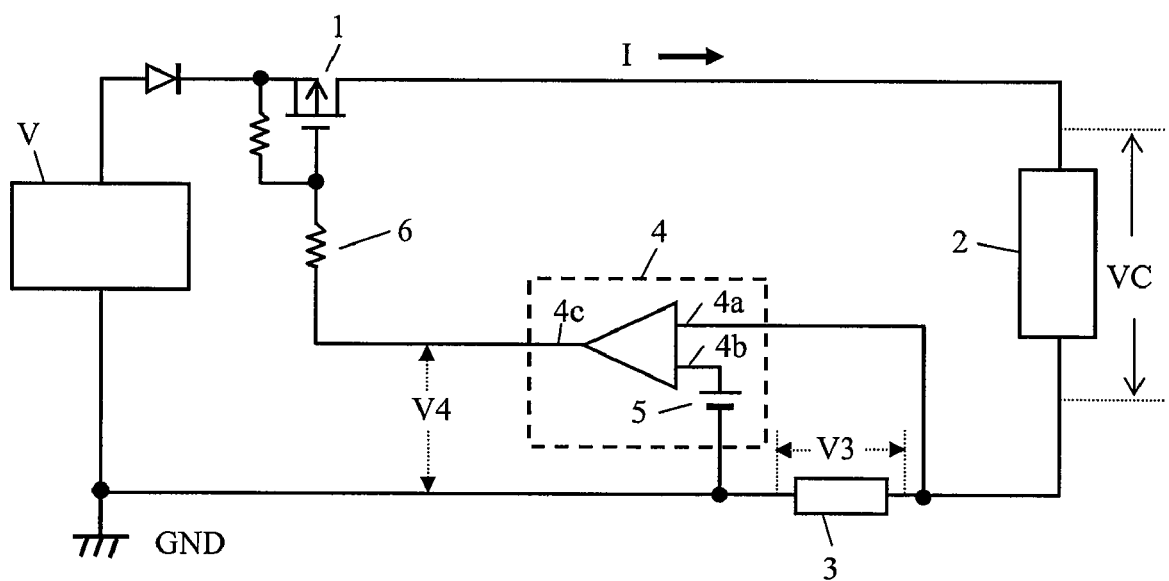
FIG. 13 is a block circuit diagram of a conventional charging apparatus.

FIGS. 11 and 12 show a charging apparatus according to a fifth embodiment of the present invention. The fifth embodiment will be described on the case where it is configured by combination with the fourth embodiment.

FIG. 11 is a block circuit diagram of the charging element and its vicinity of the charging apparatus according to the fifth embodiment. FIG. 12 shows change over time in the capacitor charging current of the charging apparatus. In FIG. 11, like reference numerals denotes the same components as in FIG. 9.

FIG. 11 is an excerption of charging element 15 and control synthetic circuit 20 in charging apparatus 100 described in the fourth embodiment. Another charging element 49 is connected to charging element 15 in a parallel state thereto. Ones of the terminals of switch 50a and switch 50b for transmitting a charge control signal outputted from control synthetic circuit 20 are connected to the control terminals of charging elements 15 and 49, respectively. The others of the terminals of switches 50a and 50b are connected commonly and connected to control synthetic circuit 20. Switches 50a and 50b are driven to ON/OFF state by switch driving portion 51. Because the circuit portions such as control synthetic circuit 20, switch driving portion 51 and switches 50a and 50b are constituted of a microcomputer, the circuits thereof are simplified, thereby enabling low cost and a small sized charging apparatus 100.

Next, a circuit operation in the fifth embodiment will be described. Signals 51a and 51b for turning ON/OFF alternately at the same frequency are outputted from switch driving portion 51. Consequently, the charging control signals outputted from control synthetic circuit 20 are transmitted to charging elements 15 and 49 alternately through switches 50a and 50b so that the charging is performed.

FIG. 12 shows change over time in the charging current. Here, it is assumed that currents flowing through charging element 15 and charging element 49 are expressed by If1 and If2, respectively. With this structure, loss power of the charging element from charge start time t0 to charge completion time t2 can be distributed equally to two charging elements 15 and 49. Generated heat due to this loss power is transferred to the radiator plate from a radiating fin (not shown) of charging elements 15 and 49, so that thermal resistance between the radiating fin and the radiator plate is reduced equivalently to ½, whereby the temperature rise in charging elements 15 and 49 can be reduced.

In the fifth embodiment, duty of currents If1 and If2 is set to 50%, that is, the ON period is set to ½. Thus, as a result of various considerations under this condition, it has been found that the ON/OFF cycle of charging elements 15 and 49 is preferably set to 20 milliseconds or less where thermal resistance reduction characteristic can be applied. Consequently, charging elements 15 and 49 can be driven with reduced thermal resistance, whereby maximum temperature Tjmax therein can be reduced.

Although two charging elements 15 and 49 are used in the fifth embodiment, three or more charging elements may be used. In such a case, all the charging elements are connected in parallel as in the fifth embodiment and the same number of switches are prepared. When actuating each charging element, the charging elements are driven in sequence by switching the switches in order. Consequently, heat generation in charging elements 15 and 49 can be further suppressed.

With the above-described structure and operation, maximum temperature Tjmax of charging elements 15 and 49 can be reduced, thereby providing a charging apparatus with very high reliability.

Although the fifth embodiment has been described by combining with the fourth embodiment, the same effect can be obtained by combining with other embodiments.

INDUSTRIAL APPLICABILITY

Because the charging apparatus according to the present invention can suppress the temperature inside the charging element to a low level, the reliability of the charging element can be improved. Thus, the present invention is effective as a charging apparatus which charges a capacitor in particular rapidly, and therefore, its industrial applicability is wide.

The invention claimed is:

1. A charging apparatus having a charging element connected between a DC power supply and a capacitor for charging the capacitor with the DC power supply through the charging element, comprising:
a constant-voltage-control-circuit for controlling a charging voltage to the capacitor to be constant;
a current detecting portion for detecting a charging current in a charging path from the DC power supply to the capacitor;
a voltage detecting portion for detecting a difference between a voltage of the capacitor and a voltage corresponding to the DC power supply; and
an integrator for integrating output signals of the current detecting portion and the voltage detecting portion, wherein
the capacitor is charged by controlling power of the charging element to a predetermined value using an output signal of the integrator, and
the capacitor is charged up to a predetermined voltage with the charging element controlled by the constant-voltage-control-circuit.

2. The charging apparatus according to claim 1, further comprising:
a power switching portion for controlling a power of the charging element to be reduced when the output signal of the voltage detecting portion is not higher than the predetermined value.

3. A charging apparatus having a charging element connected in series between a DC power supply and a capacitor for charging the capacitor with the DC power supply through the charging element, comprising:
a constant-voltage-control-circuit for controlling a charging voltage to the capacitor to be constant;
a current detecting portion for detecting a charging current in a charging path from the DC power supply to the capacitor;
a current limiting portion for controlling a charging current to the capacitor;
a voltage detecting portion for detecting a difference between a voltage of the capacitor and a voltage corresponding to the DC power supply; and
an integrator for integrating output signals of the current detecting portion and the voltage detecting portion, wherein
the capacitor is charged by controlling power of the charging element to a predetermined value using an output signal of the integrator, and
the current limiting portion charges the capacitor to a predetermined voltage by limiting the maximum value of the charging current, and the constant-voltage-control-circuit charges the capacitor up to a predetermined voltage by controlling the charging element.

4. The charging apparatus according to claim 1 wherein an output voltage measured at the voltage detecting portion is a voltage of a circuit portion including all circuit components in which the charging current flows between the DC power supply and the capacitor.

5. The charging apparatus according to claim 1, further comprising:
a plurality of switches for transmitting a charge control signal for controlling the charging element to each of the charging elements, the plurality of the switches being constructed by connecting a plurality of the charging elements in parallel to each other, wherein
the switches are switched in sequence.

6. A charging apparatus having a structure in which a plurality of charging elements are connected in parallel between a DC power supply and a capacitor to charge the capacitor by the DC power supply through the plurality of charging elements, comprising:
- a current detecting portion for detecting a charging current in a charging path from the DC power supply to the capacitor;
- a constant-current-control-circuit for controlling the charging current to the capacitor to be constant;
- a constant-voltage-control-circuit for controlling a charging voltage to the capacitor;
- a capacitor voltage detecting portion for detecting a voltage of the capacitor;
- a current switching portion for switching a current of the constant-current-control-circuit to a plurality of currents; and
- a plurality of switches for transmitting a charge control signal for controlling each of the plurality of charging elements, wherein
- when the plurality of charging elements are controlled by an output signal of the constant-current-control-circuit, the switches are switched in sequence and the plurality of charging currents are switched based on an output of the capacitor voltage detecting portion to charge the capacitor such that an average power of the charging element during a charging process is constant, and the capacitor is charged up to a predetermined voltage by controlling the plurality of charging elements using the constant-voltage-control-circuit.

7. The charging apparatus according to claim 6 wherein the capacitor voltage detecting portion, the current switching portion and a switch driving portion for driving the plurality of the switches for transmitting a charge control signal to each of the plurality of charging elements are constructed of a microcomputer.

8. The charging apparatus according to claim 1 wherein the capacitor is an electric double-layer capacitor.

9. The charging apparatus according to claim 3 wherein an output voltage measured at the voltage detecting portion is a voltage of a circuit portion including all circuit components in which the charging current flows between the DC power supply and the capacitor.

10. The charging apparatus according to claim 3, further comprising:
- a plurality of switches for transmitting a charge control signal for controlling the charging element to each of the charging elements, the plurality of the switches being constructed by connecting a plurality of the charging elements in parallel to each other, wherein
- the switches are switched in sequence.

11. The charging apparatus according to claim 3 wherein the capacitor is an electric double-layer capacitor.

12. The charging apparatus according to claim 6 wherein the capacitor is an electric double-layer capacitor.

* * * * *